June 25, 1935.  J. S. BAKER  2,005,724
LUBRICATING MECHANISM
Filed Nov. 21, 1932
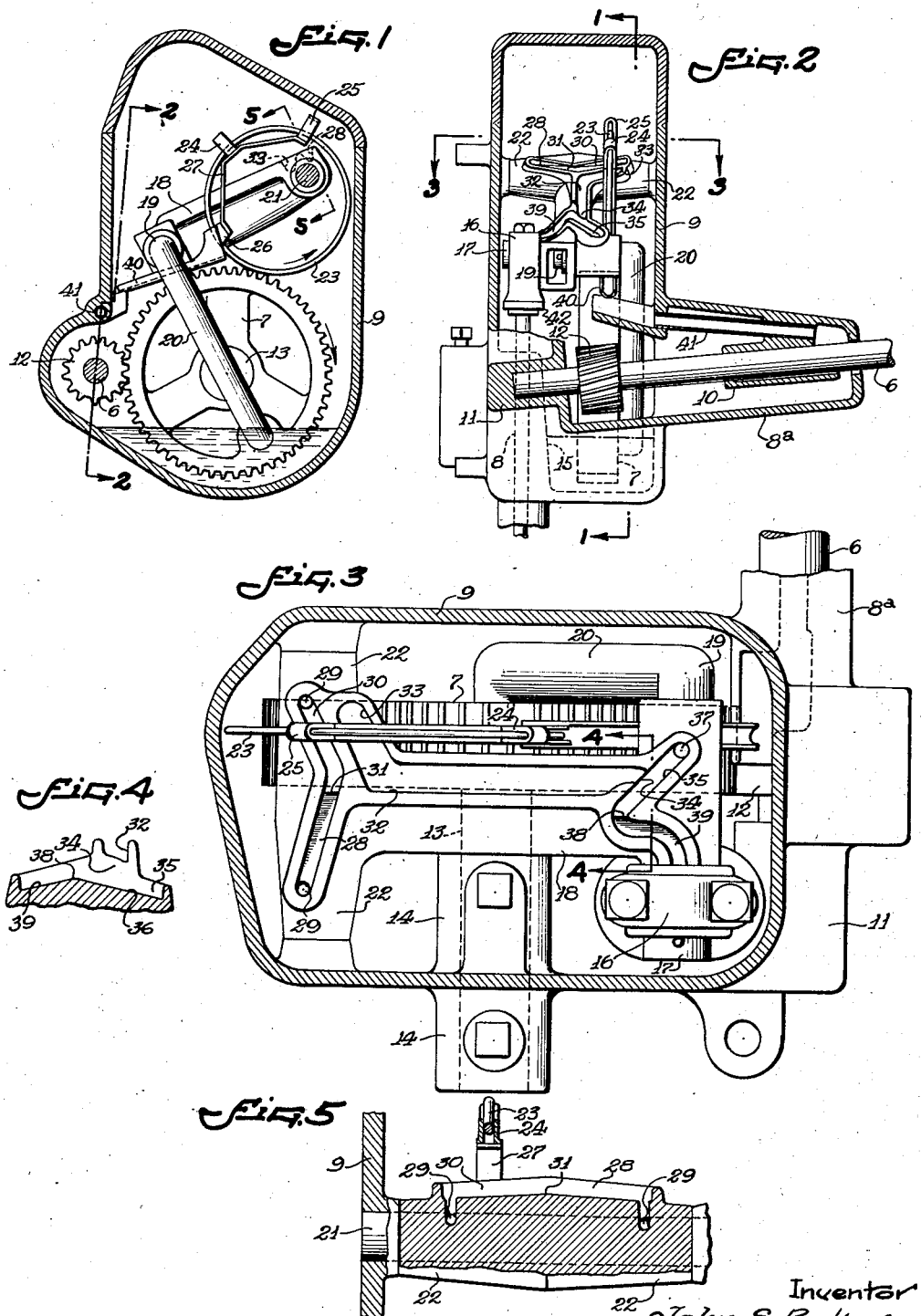
Inventor
John S. Baker
By Churchill, Parker + Carlson
Attorneys Patented June 25, 1935

2,005,724

UNITED STATES PATENT OFFICE 2,005,724

LUBRICATING MECHANISM

John S. Baker, Evansville, Wis.

Application November 21, 1932, Serial No. 643,550

21 Claims. (Cl. 184—4)

This invention relates generally to lubricating mechanisms and more particularly to the automatic lubrication of a mechanism for converting rotary into reciprocatory motion.

One object is to provide a novel means for distributing lubricating fluid to a plurality of different bearing joints in a mechanism for converting rotary into reciprocatory.

The invention also resides in the provision of a novel means for elevating the fluid from a supply sump to a point of distribution.

Other objects and advantages of the invention will become apparent from the following detailed description taken in connection with the accompanying drawing, in which Figure 1 is a sectional view of a mechanism for converting rotary into reciprocatory motion embodying the features of the present invention, the section being taken along the line 1—1 of Fig. 2.

Fig. 2 is a sectional view taken along the line 2—2 of Fig. 1.

Fig. 3 is a sectional view taken along the line 3—3 of Fig. 2.

Figs. 4 and 5 are fragmentary sectional views taken along the line 4—4 of Fig. 3 and 5—5 of Fig. 1 respectively.

In the drawing, the invention is embodied in a mechanism of the type frequently used in windmills and pumps wherein the rotary motion of a driving member in the form of a shaft 6 is converted by a crank gear 7 into reciprocatory motion of a driven member in the form of a pitman 8. The shaft is slightly inclined relative to the horizontal and its outer and upper end projects through a recess in the end of an extension 8ª of the casing 9 and is journaled at spaced points in bearings 10 and 11. Fixed on the shaft adjacent the bearing 11 is a spur pinion 12 having teeth spiraled to compensate for the inclination of the shaft and crank axes and meshing with the crank gear which is rotatable on a shaft 13 supported by flanges 14 integral with the casing.

The pitman projects upwardly through an opening in the tube 15 upstanding from the bottom of the casing, and the upper end of the pitman is connected by a swivel joint 16 to a trunnion 17 projecting laterally from the free end of a rocker member 18. Projecting into a recess in the opposite side of the rocker arm is a lateral extension 19 of a connecting rod 20, the lower end of which has a similar extension projecting into a recess near the periphery of the crank gear.

The rocker member is supported for vertical oscillation by a horizontal pivot in the form of a shaft 21, the opposite ends of which project into and have a tight fit in recesses formed in opposite side walls of the casing. To provide the desired bearing area, the pivoted end of the rocker is formed with lateral arms 22. With the rocker thus supported, it will be apparent that in each revolution of the crank gear 7, the rocker will move upwardly and downwardly through horizontal position between a lower position shown in Fig. 1 and an upper position.

The lower portion of the casing 9 forms a sump for a quantity of lubricating fluid into which the lower segmental portion of the crank gear dips, some of the fluid being transferred from this gear to the pinion from which it runs down to the bearing 11. The upper connecting rod bearing, the swivel joint 16, and the rocker pivot are disposed above the level of the crank gear and must be lubricated by other means. The means herein provided for elevating lubricant from the sump to the point of distribution above the bearings comprises a substantially rigid ring 23 encircling the shaft 21 and disposed in the plane of the crank 7 above the latter. The ring rests upon the upper portion of the crank gear and is maintained in this position by a U-shaped guide member 24 engaging the inner ring surface so as to hold the ring properly positioned in contact with the gear teeth. The guide 24 and guides 25 and 26 connected thereto by arms 27, provide lateral support for the ring which is, in view of its frictional contact with the teeth of the crank gear, rotated continuously in a counterclockwise direction (Fig. 1) during rotation of the latter. In such rotation, a portion of the lubricating fluid carried upwardly by the crank gear is transferred onto the ring and thereby elevated automatically.

The present invention contemplates scraping a portion of the oil carried by the ring off from the surface thereof and distribution of this oil to the different bearings. For this purpose, the guide 25 is disposed directly above the shaft 21. An upwardly opening receptacle in the form of an elongated groove 28 is formed in the rocker and its bearing arms 22 with one end portion adapted when the rocker is in its lowermost position shown in Fig. 1 to receive the oil dropping from the guide 25. Holes 29 are formed at opposite ends of the groove to permit oil to flow from the groove to the bearing surfaces formed by the shaft 21. In the present instance, the ends of the groove are inclined relative to the axis of the shaft 21 and the central portion disposed more remotely from this shaft so that in the lowermost position of the rocker arm, the bottom portion 30 of the groove will slope downwardly from the adjacent hole 29 causing a portion of the oil to flow over a ledge 31 near the center of the groove and thus become entrapped in the other end portion of the groove during the succeeding upward stroke of the rocker. In view of the inclination of the end portions of the groove relative to the shaft 21, it will be apparent that in the upward stroke of the rocker, the center of the groove will be raised above the level of the holes 29 thereby changing the inclination of the bottom surfaces of the groove ends and automatically increasing this inclination so as to induce a positive flow of oil toward the respective holes 29. The relatively large and widely spaced rocker bearing surfaces are thus thoroughly lubricated at all times.

Extending longitudinally of the rocker member is a second upwardly opening receptacle in the form of a groove 32 having a lateral extension 33 at one end disposed adjacent the groove 28. When the rocker is above horizontal position, the extension 33 is positioned beneath the guide 25 and thus receives the oil dropping therefrom. During the lower half of the rocker stroke, the oil thus received flows down along the arm and is discharged over a ledge 34 into a groove 35 leading to a hole 37 in the joint at the upper end of the connecting rod. The groove 35 is at an angle with the hinge pin 21. Because of this angle when the rocker is up, some of the oil which is discharged into the groove 35 flows over a ledge 38 into a groove 39. When the rocker is down, this oil runs into the bearing of the swivel joint 16. Any oil overflowing the swivel joint 16 accumulates around the lower edge of an overhanging flange 42 and drops back into the sump without flowing down the pitman 8. Loss of oil by leakage along the pitman is thereby avoided.

It will be apparent that the oil removed from the ring 23 by the guide 25 falls first into the groove 30 and then into the groove 33 as an incident to rocking of the arm 18, part of the oil being distributed to the rocker pivot and the remainder to the connecting rod and swivel joints. Sufficient oil will be available for all of these bearings owing to the fact that the guide 25 is the first to be engaged by a portion of the ring surface after passing out of contact with the crank gear.

Since the guide 25 bears only against the sides of the ring 23, only a portion of the oil on the ring surface is scraped off and distributed to the rocker bearings. The guides 24 also bear against the inner peripheral surface of the ring and thus scrape off an additional quantity of the oil which flows down the arm 27 by which the ring guides are supported into an inclined trough 40. The trough discharges into a tube 41 leading to the outermost end of the shaft bearing 10. The guide 26 also serves to scrape off oil from the surface of the ring and deliver the same to the trough. Some of the oil discharged onto the bearing 10 runs down along the shaft 6 and the surplus drops onto the bottom of the casing extension 8ᵃ and flows back into the oil sump.

From the foregoing, it will be apparent that the invention provides an extremely reliable means for effecting continuous self-lubrication of all of the different bearings in a mechanism of the character described. The elevating mechanism is of simple and inexpensive character and all of the bearing surfaces supporting the same are self-lubricating.

I claim as my invention:

1. In a mechanism for converting rotary motion of a driving member into reciprocatory motion of a driven member, the combination of a casing having recesses therein through which said members project and providing a sump at its lower end for containing lubricating fluid, an elongated rocker above the level of liquid in said casing, bearing supports on opposite sides of said rocker at one end thereof supporting the latter for vertical movement of its free end about a horizontal axis and above and below horizontal position, an elongated upwardly opening groove on the rocker disposed generally longitudinally of and adjacent said axis and having opposite ends communicating with the surfaces of said supports and disposed closer to said axis than the intermediate portion of the groove, the opposite end portions of said groove having bottom surfaces which slope toward said supports when said rocker is disposed above horizontal position, means operable as an incident to rotation of said driving member to convey fluid upwardly from said sump and discharge the same downwardly into said groove, and a ledge intermediate the ends of the groove for entrapping fluid in each end thereof in the upward movement of said rockers.

2. In a mechanism for converting rotary motion of a driving member into reciprocatory motion of a driven member, the combination of a casing having recesses therein through which said members project and providing a sump at its lower end for containing lubricating fluid, an elongated rocker above the level of liquid in said casing, spaced bearing supports providing a horizontal pivot for one end of said rocker, means for conveying fluid upwardly from said sump and discharging the same downwardly from a point above said pivot, a receptacle on the pivoted end of said rocker opening upwardly to receive said fluid and having bottom surfaces slanting in opposite directions toward and communicating with the bearing surface of each of said supports, the inclination of said bottom surfaces increasing automatically in the upward movement of the free end of said rocker.

3. In a mechanism for converting rotary motion of a driving member into reciprocatory motion of a driven member, the combination of a casing having recesses therein through which said members project and providing a sump at its lower end for containing lubricating fluid, an elongated rocker above the level of liquid in said casing, spaced bearing supports providing a horizontal pivot for one end of said rocker, means for conveying fluid upwardly from said sump and discharging the same downwardly from a point above said pivot, an elongated receptacle on the pivoted end of said rocker opening upwardly to receive the fluid discharged downwardly and having its intermediate portion spaced from the pivot and its opposite end portions sloping toward the pivot and communicating with the bearing surfaces of said supports, said portions having oppositely sloping bottom surfaces increasing in inclination in the upward movement of said rocker, and means operable in such upward movement to entrap some of said fluid in each end portion of said groove.

4. In a mechanism for converting rotary motion of a driving member into reciprocatory motion of a driven member, the combination of a casing having recesses therein through which said members project and providing a sump at its lower end for containing lubricating fluid, an elongated rocker above the level of liquid in said casing, spaced bearing supports providing a horizontal pivot for one end of said rocker, means for conveying fluid upwardly from said sump and discharging the same downwardly from a point above said pivot, a receptacle on the pivoted end of said rocker opening upwardly to receive said fluid and communicating with the bearing surfaces of each of said supports, means operating during the movement of said rocker in one direction to divide the fluid in said receptacle into two parts, and the bottom surface of said receptacle being shaped to induce an increased flow of said fluid parts toward said bearing surfaces during the remainder of the rocker stroke.

5. In a mechanism for converting rotary motion of a driving member into reciprocatory motion of a driven member, the combination of a casing having recesses therein through which said members project and providing a sump at its lower end for containing lubricating fluid, a rocker arm mounted in said casing for vertical oscillation through horizontal position about a horizontal pivot above the level of said fluid, the free end of said arm having a pivotal connection with said driven member, means for conveying fluid from said sump to a point above said pivot and discharging the same in a downward direction, an upwardly opening receptacle on said arm adjacent said pivot communicating with the bearing surface thereof and adapted to receive the fluid during the lower portion of the rocker stroke, and an elongated upwardly opening receptacle extending longitudinally of said arm and communicating at one end with the bearing surface of said connection, the other end being disposed adjacent said pivot and adapted to receive the fluid during the upper portion of the rocker stroke.

6. In a mechanism for converting rotary motion of a driving member into reciprocatory motion of a driven member, the combination of a casing having recesses therein through which said members project and providing a sump at its lower end for containing lubricating fluid, a rocker arm mounted in said casing for vertical oscillation through horizontal position about a horizontal pivot above the level of said fluid, the free end of said arm having a pivotal connection with said driven member, means for conveying fluid upwardly from said sump and discharging a stream thereof downwardly, upwardly opening receptacles on said arm disposed different distances from said pivot so as to receive said stream in different portions of the rocker stroke, said receptacles communicating respectively with the bearing surfaces of said pivot and connection and having bottom surfaces each shaped to induce the flow of fluid to the associated bearing during the portion of the rocker stroke when said stream is being discharged into the other receptacle.

7. In a mechanism for converting rotary motion of a driving member into reciprocatory motion of a driven member, the combination of a casing having recesses therein through which said members project and providing a sump at its lower end for containing lubricating fluid, a rocker arm mounted in said casing for vertical oscillation through horizontal position about a horizontal pivot above the level of said fluid, the free end of said arm having a pivotal connection with said driven member, means for conveying fluid upwardly from said sump and discharging a stream thereof downwardly, and upwardly opening receptacles on said arm communicating respectively with the bearing surfaces of said connection and pivot and movable alternately during successive strokes of the arm to positions for receiving said stream.

8. In a mechanism for converting rotary motion of a driving member into reciprocatory motion of a driven member, the combination of a casing having recesses therein through which said members project and providing a sump at its lower end for containing lubricating fluid, a rocker arm mounted in said casing for vertical oscillation through horizontal position about a horizontal pivot above the level of said fluid, the free end of said arm having a pivotal connection with said driven member, upwardly opening receptacles on said arm communicating respectively with the bearing surfaces of said pivot and connection and having bottom surfaces shaped to induce the flow of fluid toward said surfaces depending on the position of said arm, and means operable as an incident to rotation of said driving member to convey fluid upwardly from said sump and discharge the same downwardly into said receptacles first one and then the other.

9. In a mechanism for converting rotary motion of a driving member into reciprocatory motion of a driven member, the combination of a casing providing a sump for lubricating fluid and having recesses above the level of said fluid through which said members project, a rocker mounted in said casing for vertical oscillation above the level of said fluid and having a pivotal connection with the end of said driven member, a crank driven from said driving member, a connecting rod for said crank having a pivotal connection with the free end of said arm, said connections being spaced apart and substantially alined, an upwardly opening groove extending generally longitudinally of the axes of said connections and sloping at opposite ends toward the bearing surfaces of the connections during the upper half portion of the rocker arm stroke, and means for elevating the fluid from said sump and discharging the same into said groove during the lower half portion of the rocker arm stroke, said groove retaining the fluid therein during the subsequent movement of the rocker arm.

10. In a mechanism for converting rotary motion of a driving member into reciprocatory motion of a driven member, the combination of a casing providing a sump for lubricating fluid and having recesses above the level of said fluid through which said members project, a rocker mounted in said casing for vertical oscillation above the level of said fluid and having a pivotal connection with the end of said driven member, a crank driven from said driving member, a connecting rod for said crank having a pivotal connection with the free end of said arm, said connections being spaced apart and substantially alined, an upwardly opening groove extending generally longitudinally of the axes of said connections and sloping at opposite ends toward the bearing surfaces of the connections during the upper half portion of the rocker arm stroke, means for elevating the fluid from said sump and discharging the same into said groove during the lower half portion of the rocker arm stroke, and means operable during the upper half portion of the rocker arm stroke to separate the fluid in said groove into two parts.

11. In a mechanism for converting rotary motion of a driving member into reciprocatory motion of a driven member, the combination of a casing providing a sump for lubricating fluid and having recesses above the level of said fluid through which said members project, a rocker arm mounted in said casing above the level of said fluid for vertical oscillation about a horizontal pivot and having a connection with said driven member, a crank gear driven by said driving member mounted within said casing for rotation about a horizontal axis and having a lower segmental portion dipping in said liquid, a connecting rod between said gear and said arm, a substantially rigid ring disposed in a vertical plane and encircling the axis of said pivot, said ring resting on the periphery of said gear so as to be rotated thereby, means for scraping the fluid from the surface of said ring at a point above the level of said pivot, and means receiving said fluid and inducing the flow thereof to the pivot bearing.

12. In a mechanism for converting rotary motion of a driving member into reciprocatory motion of a driven member, the combination of a casing providing a sump for lubricating fluid and having recesses above the level of said fluid through which said members project, a rocker arm mounted in said casing above the level of said fluid for vertical oscillation about a horizontal pivot and having a pivotal connection with said driven member, a crank gear driven by said driving member mounted within said casing for rotation about a horizontal axis with a lower segmental portion dipping in said liquid, a connecting rod actuated by said gear and having a connection with the free end of said arm, a substantially rigid ring vertically disposed and rotated by said gear by frictional contact with a peripheral surface thereof whereby a portion of said fluid will be elevated by said gear and ring, and means located above the level of said pivot and acting during rotation of the ring to scrape fluid from the surface thereof.

13. In a mechanism for converting rotary motion of a driving member into reciprocatory motion of a driven member, the combination of a casing providing a sump for lubricating fluid and having recesses above the level of said fluid through which said members project, a rocker arm mounted in said casing above the level of said fluid for vertical oscillation about a horizontal pivot and having a pivotal connection with said driven member, a crank gear driven by said driving member and mounted within said casing for rotation about a horizontal axis with a lower segmental portion dipping in said liquid, a connecting rod actuated by said gear and having a connection with the free end of said arm, a substantially rigid ring vertically disposed and resting upon the toothed periphery of said gear so as to be rotated thereby and pick up a portion of the fluid thereon, means for scraping off the fluid from the surface of said ring, and means receiving the fluid removed from the ring and distributing the same to bearing surfaces between said rocker arm and said pivot, said crank and said driven member.

14. In a mechanism of the character described, the combination of a casing providing a sump for lubricating fluid, a bearing to be lubricated disposed above the level of said liquid, a vertically disposed rotary member having a lower segmental portion dipping in said fluid, a substantially rigid ring rotatably mounted above said member and continuously contacting a peripheral surface thereof above the fluid level so as to be rotated by the member, and means located above said bearing for scraping fluid from a continuous annular surface of said ring during rotation of the latter and directing the flow of the fluid thus removed toward said bearing.

15. In a mechanism of the character described, the combination of a casing providing a sump for lubricating fluid, a bearing to be lubricated disposed above the level of said liquid, a vertically disposed gear having radially projecting teeth and mounted for rotation with its lower peripheral portion dipping into said fluid, a ring disposed in the plane of said gear and resting constantly upon the upper portion thereof so as to be rotated thereby, and means located above said bearing for scraping the surface of said ring to remove fluid therefrom.

16. In a mechanism of the character described, the combination of a casing providing a sump for lubricating fluid, a plurality of bearings to be lubricated disposed above the level of said fluid, a vertically disposed rotary member having a lower segmental portion dipping in said fluid, a vertically disposed rotatable ring frictionally contacting a peripheral surface of said member so as to be rotated continuously thereby, means located at a plurality of annularly spaced points around said ring for scraping fluid from the surface thereof during rotation of the ring, and means receiving the fluid removed from said scraping means and distributing the same by gravitational flow to the respective bearings.

17. In a mechanism of the character described, the combination of a casing providing a sump for lubricating fluid, a plurality of bearings to be lubricated disposed above the level of said fluid, a vertically disposed rotary member having a lower segmental portion dipping in said fluid, a vertically disposed rotatable ring frictionally contacting a peripheral surface of said member so as to be rotated thereby, a plurality of scrapers contacting different peripheral surfaces of said ring and annularly spaced around the ring and acting, during rotation of the ring, to remove fluid therefrom and means receiving the fluid removed by the different scrapers and distributing the same to the respective bearings.

18. In a mechanism of the character described, the combination of a casing providing a sump for lubricating fluid, a driving shaft having a downwardly inclined end projecting into said casing and journaled in a bearing disposed above the level of said fluid, a vertically disposed rotary member driven by said shaft and having an annular peripheral surface the lower portion of which dips into said fluid, a rocker mounted within said casing to swing about a pivot disposed above said member, a rotatably mounted upright ring running constantly in frictional contact with said surface, a plurality of scrapers contacting said ring at annularly spaced points disposed respectively above said bearing and said pivot and acting, during the rotation of said ring by said member, to remove fluid from the ring, and means receiving the fluid removed from said ring by the respective scrapers and distributing the same to the respective bearings.

19. In a mechanism of the character described, the combination of a casing providing a sump for lubricating fluid, a bearing to be lubricated disposed above the level of said liquid, a vertically disposed rotary member having a lower segmental portion dipping in said fluid, and means for elevating fluid from said sump to a point above said bearing including an endless carrier advanced continuously by constant frictional rubbing contact with a peripheral surface on said member.

20. In a mechanism of the character described, the combination of a casing providing a sump for lubricating fluid, a vertically disposed rotary crank member within said casing dipping into said fluid, an arm mounted in said casing to turn about a fixed horizontal axis, and means for elevating fluid from said sump to a point above said axis including a ring encircling said axis.

21. In a mechanism of the character described, the combination of a casing providing a sump for lubricating fluid, a vertically disposed rotary crank member within said casing dipping into said fluid, a bearing to be lubricated disposed above the level of the fluid in said sump, means for elevating fluid from said sump to a point above said bearing including an endless carrier having an uninterrupted peripheral surface in constant rubbing contact with the periphery of said crank member, and a scraper in constant contact with said continuous surface above the level of said bearing.

JOHN S. BAKER.